(12) United States Patent
Kim et al.

(10) Patent No.: US 12,519,326 B2
(45) Date of Patent: Jan. 6, 2026

(54) APPARATUS AND METHOD FOR HVIL STATE MONITORING AND CONTROL IN BATTERY PACK AND BATTERY SYSTEM

(71) Applicant: SAMSUNG SDI CO., LTD., Yongin-si (KR)

(72) Inventors: Hyun Kim, Yongin-si (KR); Keunyoung Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 160 days.

(21) Appl. No.: 18/378,971

(22) Filed: Oct. 11, 2023

(65) Prior Publication Data

US 2024/0291299 A1    Aug. 29, 2024

(30) Foreign Application Priority Data

Feb. 24, 2023    (KR) .................. 10-2023-0025398

(51) Int. Cl.
| | |
|---|---|
| *H02H 7/00* | (2006.01) |
| *G01R 31/67* | (2020.01) |
| *H02H 7/18* | (2006.01) |
| *H02J 7/00* | (2006.01) |

(52) U.S. Cl.
CPC ............ *H02J 7/0036* (2013.01); *G01R 31/67* (2020.01); *H02H 7/18* (2013.01)

(58) Field of Classification Search
None
See application file for complete search history.

(56) References Cited

U.S. PATENT DOCUMENTS

| | | | | |
|---|---|---|---|---|
| 6,265,848 | B1 * | 7/2001 | Mukainakano | ....... H02J 7/0047 320/132 |
| 9,550,422 | B2 * | 1/2017 | Luedtke | ................ B60L 3/0023 |
| 9,802,495 | B2 * | 10/2017 | Sun | .......................... B60L 53/62 |
| 10,446,814 | B2 * | 10/2019 | Gross | ...................... B60L 50/64 |

(Continued)

FOREIGN PATENT DOCUMENTS

| | | |
|---|---|---|
| CN | 110058180 A | 7/2019 |
| EP | 3627161 A2 | 3/2020 |

(Continued)

OTHER PUBLICATIONS

European Search Report dated Feb. 8, 2024.

*Primary Examiner* — Stephen W Jackson
(74) *Attorney, Agent, or Firm* — Lee IP Law, P.C.

(57) ABSTRACT

An apparatus and method for HVIL monitoring and control of an abnormal condition may be included to pass through a plurality of high voltage connectors of a battery pack, and inadequate electrical continuity of the HVIL may be identified with HVIL main power as the HVIL signal. If an abnormal condition exists in the HVIL (e.g., an open circuit), the HVIL main power may be switched to localized HVIL auxiliary power by a controller to individually check each connector for HVIL signal continuity. Each connector may be independently supplied with HVIL auxiliary power localized to the connector, to identify the state of that connector. Application, for example, to an electric vehicle, to differentiate between a potentially hazardous disconnect in a battery pack and a faulty low voltage HVIL signal line while driving to initiate safety control, if appropriate, enables a safer driving environment and experience.

27 Claims, 9 Drawing Sheets

(56) References Cited

U.S. PATENT DOCUMENTS

2022/0029441 A1  1/2022 Park
2023/0027996 A1  1/2023 Fritz et al.

FOREIGN PATENT DOCUMENTS

KR      10-1469356 B1  12/2014
KR  10-2022-0012070 A   2/2022
KR  10-2022-0026094 A   3/2022
KR  10-2022-0040589 A   3/2022

* cited by examiner

APPARATUS AND METHOD FOR HVIL STATE MONITORING AND CONTROL IN BATTERY PACK AND BATTERY SYSTEM

CROSS-REFERENCE TO RELATED APPLICATION

This application claims priority to and the benefit of Korean Patent Application No. 10-2023-0025398 filed in the Korean Intellectual Property Office on Feb. 24, 2023, the entire contents of which are incorporated herein by reference.

BACKGROUND

1. Field

The present disclosure relates to an HVIL system and method, a battery pack, a battery system, an HVIL state monitoring apparatus and method, and an HVIL state monitoring control method.

2. Description of Related Art

When a human body comes in contact with high electrical voltage (e.g., a voltage of 60V or more), it may cause bodily injury. To prevent this, a high voltage battery pack includes a function for diagnosing the connection state of a high voltage connector, and this function may be generally implemented through a high voltage interlock loop (HVIL) or hazardous voltage interlock loop (HVIL).

HVIL uses a continuous low-voltage loop that monitors all high voltage connectors and components. HVIL receives power from the outside and delivers it to the outside of the battery pack through several high voltage connectors in the high voltage battery pack. The power status of this HVIL may be monitored by a battery management system (BMS) to check the connection status of high voltage connectors and components.

On the other hand, in a battery system in which multiple battery packs are connected in series and/or parallel, a method of providing power to the HVIL from the electronic control unit (ECU) of a vehicle and returning the power to the ECU of the vehicle through the HVIL of each battery pack is used. An HVIL status monitoring apparatus in each battery pack monitors the connection status of the high voltage connectors in the battery pack utilizing the input power of the HVIL. However, this method cannot accurately determine whether a defect has occurred inside the battery pack or outside the battery pack. Therefore, even if a defect occurs in the HVIL line outside the battery pack, the ECU may determine that there is a hazardous state in which high voltage is exposed and may initiate or operate an emergency protection function that may block or cut the power supply from the battery pack to the vehicle. Such loss of power to the vehicle during operation of the vehicle would result in loss of control of the vehicle and create a dangerous and potentially catastrophic condition.

SUMMARY

Embodiments are directed to an apparatus and method for HVIL monitoring and control. An HVIL monitored for an abnormal condition may be included to pass through a plurality of high voltage connectors of a battery pack. Inadequate electrical continuity of the HVIL may be identified with HVIL main power as the HVIL signal. If an abnormal condition exists in the HVIL (e.g., an open circuit), the HVIL main power may be switched to localized HVIL auxiliary power by controller to individually check each connector for HVIL signal continuity. Each connector may be independently supplied with HVIL auxiliary power localized to the connector, to identify the state of each connector. Embodiments may be applied to, for example, an electric vehicle, to differentiate between a potentially hazardous disconnect in a battery pack and a faulty low voltage HVIL signal line while driving, to initiate safety control, as appropriate.

Various embodiments include a battery pack, a battery system, an HVIL state monitoring apparatus and method, and an HVIL state monitoring control method capable of detecting defects in the battery pack.

According to one aspect, a battery pack may be provided. The battery pack includes a high voltage interlock loop (HVIL) signal line, at least one high voltage connector connected to form one HVIL loop, and an HVIL state monitoring apparatus having an HVIL auxiliary power supply that generates an HVIL auxiliary power signal and applies the HVIL auxiliary power signal to an input terminal of the at least one high voltage connector while an external controller stops applying an HVIL main power signal to the HVIL signal line.

The HVIL state monitoring apparatus may include: an input switch connected between an input node through which the HVIL signal line is input and the HVIL auxiliary power supply; an output switch connected between an output node from which the HVIL signal line is output and a ground; and a controller is configured to turn off the input switch and the output switch while applying the HVIL main power signal to the HVIL signal line by the external controller, and turn on the input switch and the output switch while stopping applying the HVIL main power signal to the HVIL signal line by the external controller.

The controller may detect a connection state of the high voltage connector in response to an HVIL diagnosis instruction from the external controller and transmit connection state detection information of the high voltage connector to the external controller.

The controller may be configured turn off the input switch and the output switch in response to a first HVIL diagnosis instruction from the external controller, and turn on the input switch and the output switch in response to a second HVIL diagnosis instruction from the external controller.

The second HVIL diagnosis instruction may be transmitted to the HVIL state monitoring apparatus of the battery pack in which a connection state failure is detected by the external controller from the connection state detection information of the high voltage connector corresponding to the first HVIL diagnosis instruction.

The controller may detect the connection state of the high voltage connector based on a measurement value of the input node and a measurement value of the output node, and the measurement value may include at least one of voltage and current.

The controller may compare the measurement value of the input node and the measurement value of the output node with the measurement values if the connection state of the high voltage connector is normal, and detect that the connection state is defective if a comparison result does not satisfy a predetermined error range.

The HVIL state monitoring apparatus may further include: an input measurer measuring at least one of voltage and current of the input node; and an output measurer measuring at least one of a voltage and a current of the output node.

The HVIL state monitoring apparatus may further include: a first diode connected between an HVIL input terminal of the battery pack to which the HVIL signal line is input and the input node; and a second diode connected between the output node and an HVIL output terminal of the battery pack from which the HVIL signal line is output.

The HVIL main power signal and the HVIL auxiliary power signal may be one of a voltage signal, a current signal, a pulse width modulation (PWM) signal, or a frequency signal.

According to another aspect, a battery system may be provided. The battery system includes a high voltage interlock loop (HVIL) signal line; and at least one battery pack. The at least one battery pack includes: at least one high voltage connected by a connector that includes the HVIL signal line to form one HVIL loop, an HVIL auxiliary power supply that generates an HVIL auxiliary power signal, and an HVIL state monitoring apparatus that applies the HVIL auxiliary power signal to the HVIL signal line while an external controller stops applying an HVIL main power signal to the HVIL signal line.

The HVIL state monitoring apparatus may include: an input switch connected between an input node through which the HVIL signal line is input and the HVIL auxiliary power supply; an output switch connected between an output node from which the HVIL signal line is output and a ground; and a controller turning off the input switch and the output switch while applying the HVIL main power signal to the HVIL signal line by the external controller, and turning on the input switch and the output switch while stopping applying the HVIL main power signal to the HVIL signal line by the external controller.

The controller may be configured to turn off the input switch and the output switch in response to a first HVIL diagnosis instruction from the external controller, and turn on the input switch and the output switch in response to a second HVIL diagnosis instruction from the external controller.

The controller may be configured to detect a connection state of the at least one high voltage connector in response to the first HVIL diagnosis instruction and the second HVIL diagnosis instruction, respectively, and transmit connection state detection information of the at least one high voltage connector to the external controller.

The second HVIL diagnosis instruction may be transmitted to the HVIL state monitoring apparatus of the battery pack in which a connection state failure is detected by the external controller from the connection state detection information of the at least one high voltage connector corresponding to the first HVIL diagnosis instruction.

The HVIL state monitoring apparatus may further include: a first diode connected between an HVIL input terminal of the battery pack to which the HVIL signal line is input and the input node; and a second diode connected between the output node and an HVIL output terminal of the battery pack from which the HVIL signal line is output.

According to another aspect, a high voltage interlock loop (HVIL) state monitoring apparatus may be provided. The HVIL status monitoring apparatus includes: an HVIL signal line configured to connect at least one high voltage connector to form one HVIL loop; an HVIL auxiliary power supply configured to generate an HVIL auxiliary power signal; an input switch connected between an input node through which the HVIL signal line is input and the HVIL auxiliary power supply; an output switch connected between an output node from which the HVIL signal line is output and a ground; and a controller configured to turn off the input switch and the output switch while applying an HVIL main power signal to the HVIL signal line by an external controller, and turn on the input switch and the output switch while stopping applying the HVIL main power signal to the HVIL signal line by the external controller.

The controller may be configured to turn off the input switch and the output switch in response to a first HVIL diagnosis instruction from the external controller and turn on the input switch and the output switch in response to a second HVIL diagnosis instruction from the external controller.

the controller may be configured to detect a connection state of the at least one high voltage connector in response to the first HVIL diagnosis instruction and the second HVIL diagnosis instruction, respectively, and transmit connection state detection information of the at least one high voltage connector to the external controller.

The second HVIL diagnosis instruction may be transmitted to the HVIL state monitoring apparatus in which a connection state failure is detected by the external controller from connection state detection information of the at least one high voltage connector corresponding to the first HVIL diagnosis instruction.

According to another aspect, a high voltage interlock loop (HVIL) state monitoring method is provided. The HVIL status monitoring method includes: detecting a connection state of at least one high voltage connector if an HVIL main power signal is supplied by an external controller to an HVIL signal line included in at least one high voltage connector to form one HVIL loop; generating an HVIL auxiliary power signal; applying the HVIL auxiliary power signal to the HVIL signal line while the external controller stops supplying the HVIL main power signal; and detecting a connection state of the at least one high voltage connector.

The applying the HVIL auxiliary power signal to the HVIL signal line may include turning on an input switch connected between an input node through which the HVIL signal line is input and an HVIL auxiliary power supply generating the HVIL auxiliary power signal, and an output switch connected between an output node through which the HVIL signal line is output and a ground.

The HVIL state monitoring method may further include turning off the input switch and the output switch while the HVIL main power turning off the input switch and the output switch while the HVIL main power signal is applied by the external controller.

The HVIL state monitoring method may further include transmitting connection state detection information of the at least one high voltage connector to the external controller, wherein the applying the HVIL auxiliary power signal to the HVIL signal line may include stopping the supply of the HVIL main power signal by the external controller if a connection state failure is detected from the connection state detection information.

According to another aspect, a high voltage interlock loop (HVIL) state monitoring control method to monitor the connection state of at least one high voltage connector forming one HVIL loop through an HVIL signal line in an external controller is provided. The HVIL state monitoring control method includes: applying an HVIL main power signal to the HVIL signal line; receiving first connection state detection information detected in response to a first HVIL diagnosis instruction from the external controller while the HVIL main power signal is applied; and stopping supply of the HVIL main power signal if a connection state failure is detected from the first connection state detection information, wherein an HVIL auxiliary power signal may be applied to the HVIL signal line by an HVIL auxiliary power supply while the supply of the HVIL main power signal is stopped.

The HVIL state monitoring control method may further include receiving second connection state detection information of the at least one high voltage connector detected in response to a second HVIL diagnosis instruction from the external controller while the HVIL auxiliary power signal is applied.

While the HVIL auxiliary power signal is applied, an input switch connected between an input node through which the HVIL signal line is input and the HVIL auxiliary power supply and an output switch connected between an output node through which the HVIL signal line is output and a ground may be turned on, and the input switch and the output switch may be turned off while the HVIL main power signal is applied.

The HVIL state monitoring control method may further include blocking an output of a device including the at least one high voltage connector if the connection state failure is detected from the first connection state detection information.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
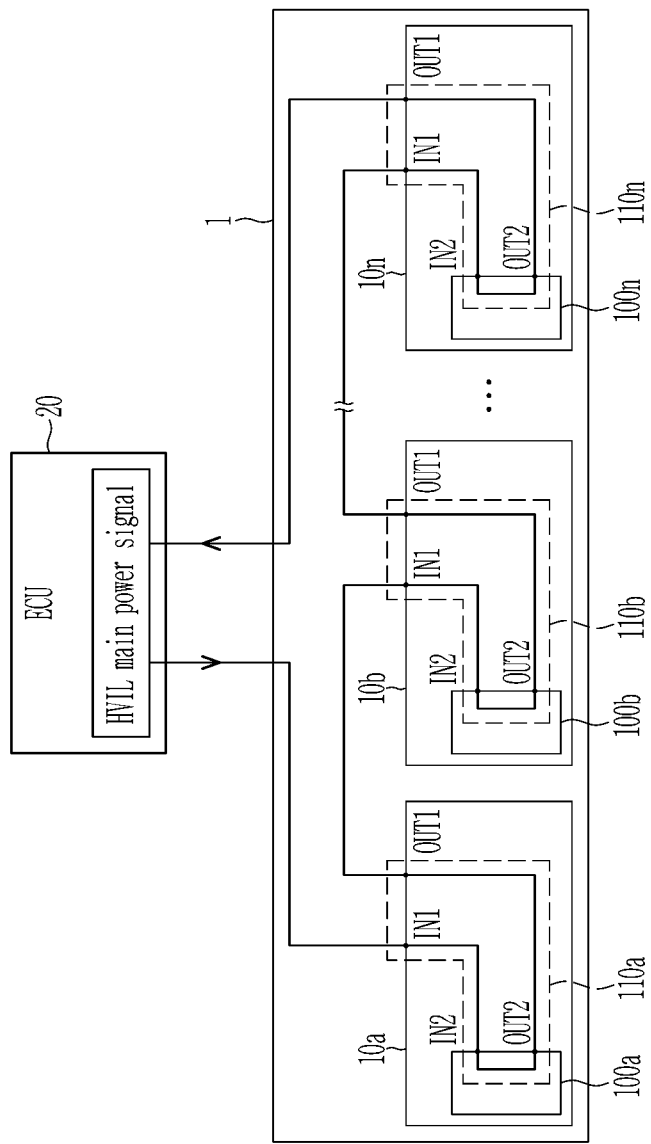
FIG. 1 is a schematic diagram showing an example of an HVIL low voltage loop of a battery system according to an embodiment.

Example embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification. In the flowchart described with reference to the drawings in this specification, the order of operations may be changed, several operations may be merged, some operations may be divided, and specific operations may not be performed.

Throughout the specification and claims, when a part is referred to "include" or "have" a certain element, it means that it may further include or have other elements rather than exclude other elements, unless specifically indicated otherwise. In addition, expressions described in the singular may be interpreted in the singular or plural.

In addition, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may be referred to as a first element.

Furthermore, when a component is referred to be "connected" with another component, it includes not only the case where two components are "directly connected" but also the case where two components are "indirectly or non-contactedly connected" with another component interposed therebetween, or the case where two components are "electrically connected." On the other hand, when an element is referred to as "directly connected" to another element, it should be understood that no other element exists in the middle.

FIG. 1 shows an example of an HVIL low voltage loop of a battery system according to an embodiment. Referring to FIG. 1, a battery system 1 may include a plurality of battery packs 10a to 10n. The battery packs 10a to 10n may be connected in series and/or in parallel with each other. Each of the battery packs 10a to 10n may include a plurality of battery cells electrically connected to each other in series and/or parallel.

Each of the battery packs 10a to 10n may include at least one high voltage connector 100a, 100b, . . . , 100n for supplying power to at least one high voltage component installed in the vehicle. The high voltage component may include, for example, an inverter, an air compressor, a positive temperature coefficient (PTC) element, and the like. The high voltage connectors 100a to 100n may connect high voltage components.

Each of the battery packs 10a to 10n may include an HVIL input terminal IN1 through which the HVIL signal line is input and an HVIL output terminal OUT1 through which the HVIL signal line is output. The high voltage connectors 100a to 100n of the battery pack 10a to 10n may include an HVIL input terminal IN2 to which the HVIL signal line is input and an HVIL output terminal OUT2 to which the HVIL signal line is output, respectively.

Each HVIL inner loop 110a to 110n of each battery pack 10a to 10n may include HVIL signal line connecting HVIL input terminal IN1, HVIL input terminal IN2, HVIL output terminal OUT2 and HVIL output terminal OUT1. The HVIL inner loops 110a to 110n of the battery packs 10a to 10n may be connected through the HVIL signal line. That is, the HVIL input terminal IN1 of the battery packs 10a to 10n-1 and the HVIL output terminal OUT1 of the other battery packs 10b to 10n may be connected through the HVIL signal line. The HVIL input terminal IN1 of the battery pack 10a may be connected to the ECU 20 through an HVIL signal line, and the HVIL output terminal OUT1 of the battery pack 10n may be connected to the ECU 20 through an HVIL signal line.

In this way, one HVIL low voltage loop for the battery system 1 can be formed. The HVIL low voltage loop may be formed such that the HVIL main power signal supplied from the ECU 20 returns to the ECU 20 sequentially through the respective high voltage connectors 100a to 100n through the HVIL signal line. Therefore, if the HVIL main power signal is supplied to the HVIL signal line, and the high voltage connectors 100a to 100n of the battery pack 10a to 10n are normally connected, one HVIL low voltage loop may be formed. On the other hand, if any one of the high voltage connectors 100a to 100n of the battery pack 10a to 10n has inadequate electrical continuity, the HVIL low voltage loop may not be formed.

Although FIG. 1 shows only one high voltage connector 100a in one battery pack (e.g., 10a) for convenience, the battery pack 10a may include two or more high voltage connectors. For example, if the battery pack 10a includes a first high voltage connector and a second high voltage connector, the HVIL input terminal IN1, the HVIL input terminal IN2 of the first high voltage connector, and the HVIL output terminal OUT2 of the first high voltage connector, the HVIL input terminal IN2 of the second high voltage connector, and the HVIL output terminal OUT2 of the second high voltage connector, and the HVIL output terminal OUT1 are connected with the HVIL signal line, and the HVIL inner loop of the battery pack 10a may be formed.

Figure 2:
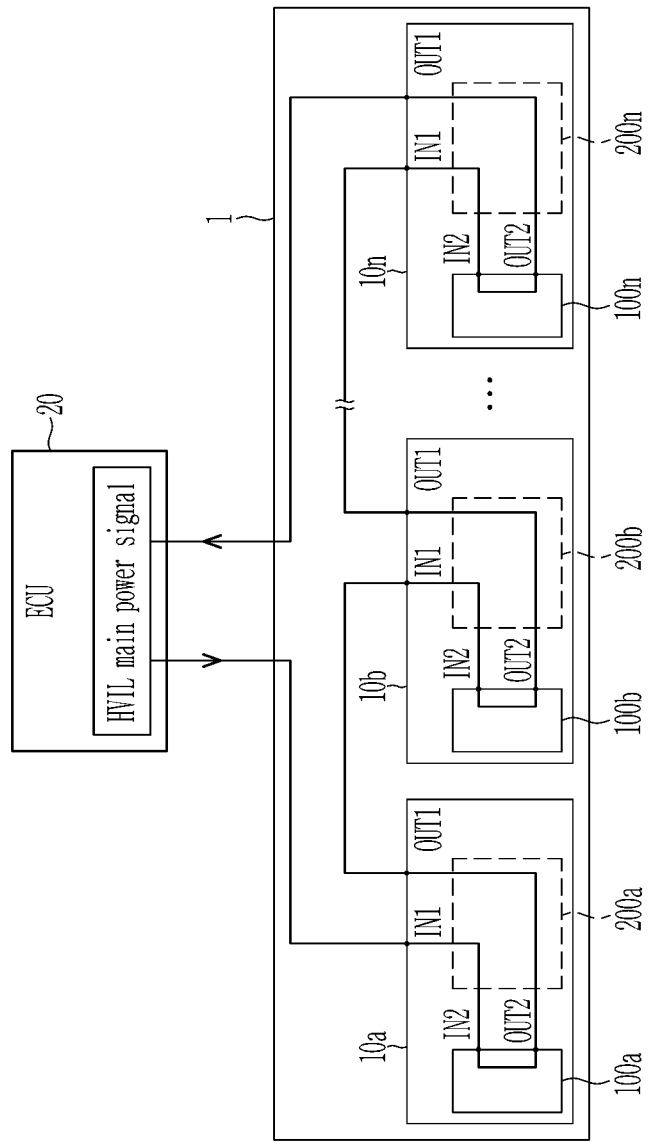
FIG. 2 is a schematic diagram showing an HVIL state monitoring apparatus of a battery system according to an embodiment.

FIG. 2 is a schematic diagram showing an HVIL state monitoring apparatus of a battery system according to an embodiment.

Referring to FIG. 2, the battery packs 10a to 10n may further include HVIL state monitoring apparatuses 200a to 200n, respectively.

The HVIL state monitoring apparatuses 200a to 200n may supply HVIL auxiliary power signal to the HVIL inner loops 110a to each respective battery pack 10a to 10n independently according to the individual HVIL diagnosis instructions of the ECU 20, respectively. Although HVIL inner loops 110a to 110n are not shown in FIG. 2 to better show the state monitoring apparatuses as well as for convenience, it is to be understood that the HVIL inner loops 110a to 110n are still present and may be thought of as being shown in FIG. 2 in the same way as in FIG. 1.

The HVIL auxiliary power signal may be one of a voltage signal, a current signal, a pulse width modulation (PWM) signal, or a frequency signal generated by the HVIL state monitoring apparatuses 200a to 200n. The HVIL state monitoring apparatuses 200a to 200n may check for defects in adequacy of electrical continuity through corresponding battery packs 10a to 10n using the HVIL auxiliary power signal for independently testing according to the individual HVIL diagnosis instructions. Internal defects of the battery packs 10a to 10n may mean defects in the connection state of the high voltage connectors 100a to 100n of the battery packs 10a to 10n, such as an open circuit.

The HVIL state monitoring apparatuses 200a to 200n may control the HVIL inner loops 110a to 110n of the battery pack 10a to 10n, respectively, so that each of the HVIL inner loops 110a to 110n of the battery pack 10a to 10n is not connected to the outside of the battery pack 10a to 10n, according to the individual HVIL diagnosis instructions. In this case, supply of the HVIL main power signal from the ECU 20 may be cut off.

Each of the HVIL inner loops 110a to 110n of the battery packs 10a to 10n may form a closed circuit if the high voltage connectors 100a to 100n are adequately connected and may form an open circuit if high voltage connectors 100a to 100n are not fastened at the connection for adequate electrical continuity. Therefore, the HVIL state monitoring apparatuses 200a to 200n may check the connection state of the high voltage connectors 100a to 100n using the HVIL inner loops 110a to 110n, respectively.

On the other hand, the HVIL state monitoring apparatuses 200a to 200n may stop the HVIL auxiliary power signal supply to the HVIL inner loops 110a to 110n of each battery pack 10a to 10n according to the entire HVIL diagnosis instruction of the ECU 20. The HVIL status monitoring apparatuses 200a to 200n may control the HVIL inner loops 110a to 110n of the battery pack 10a to 10n so that the HVIL inner loops 110a to 110n of the battery pack 10a to 10n maintain connection with the outside according to the entire HVIL diagnosis instructions.

The HVIL state monitoring apparatuses 200a to 200n may measure at least one of voltage and current of the HVIL input terminal IN1 and at least one of voltage and current of the HVIL output terminal OUT1 according to the overall HVIL diagnosis instruction or the individual HVIL diagnosis instruction of the ECU 20, respectively. For convenience of explanation, the voltage and current of the HVIL input terminal IN1 are respectively referred to as the input voltage and input current of the HVIL inner loop, and the voltage and current of the HVIL output terminal OUT1 are respectively referred to as the output voltage and output current of the HVIL inner loop.

The HVIL status monitoring apparatuses 200a to 200n may detect connection states of the high voltage connectors 100a to 100n using at least one of the input voltage and input current of the HVIL inner loop 110a to 110n and at least one of the output voltage and the output current of the HVIL inner loop 110a to 110n, respectively. The HVIL status monitoring apparatuses 200a to 200n may compare at least one of the input voltage and input current of the HVIL inner loop 110a to 110n with at least one of the reference input voltage and reference input current of the HVIL inner loop 110a to 110n measured if the connection state is normal, respectively. The HVIL status monitoring apparatuses 200a to 200n may compare at least one of the output voltage and output current of the HVIL inner loop 110a to 110n with at least one of the reference output voltage and reference output current of the HVIL inner loop 110a to 110n measured if the connection state is normal, respectively.

The HVIL status monitoring apparatuses 200a to 200n may provide connection state detection information of the high voltage connector 100a to 100n corresponding to the entire HVIL diagnosis instructions or individual HVIL diagnosis instructions to the ECU 20, respectively.

The HVIL status monitoring apparatuses 200a to 200n and the ECU 20 may perform a controller area network (CAN) communication, and the HVIL status monitoring apparatuses 200a to 200n may provide connection state detection information of the high voltage connectors 100a to 100n to the ECU 20 through CAN communication, respectively.

The HVIL status monitoring apparatuses 200a to 200n may be implemented as a battery management system (BMS) that monitors the state of the battery pack 10a to 10n.

The ECU 20, as an external controller, may control the HVIL status monitoring apparatuses 200a to 200n. As one example, the ECU 20 may be a controller for a vehicle. The ECU 20 may transmit entire HVIL diagnosis instructions or individual HVIL diagnosis instructions to the HVIL status monitoring apparatuses 200a to 200n. The ECU 20 may receive connection state detection information of the high voltage connectors 100a to 100n corresponding to the entire HVIL diagnosis instructions or individual HVIL diagnosis instructions from the HVIL status monitoring apparatuses 200a to 200n.

The ECU 20 may transmit individual HVIL diagnosis instruction to the HVIL state monitoring apparatus in which a connection state fault has occurred, based on connection state detection information of the high voltage connectors 100a to 100n corresponding to the entire HVIL diagnosis instructions.

The ECU 20 may supply the HVIL main power signal to the HVIL signal line in response to the entire HVIL diagnosis instruction. The ECU 20 may stop the HVIL main power signal supply in response to the individual HVIL diagnosis instruction.

Figure 3:
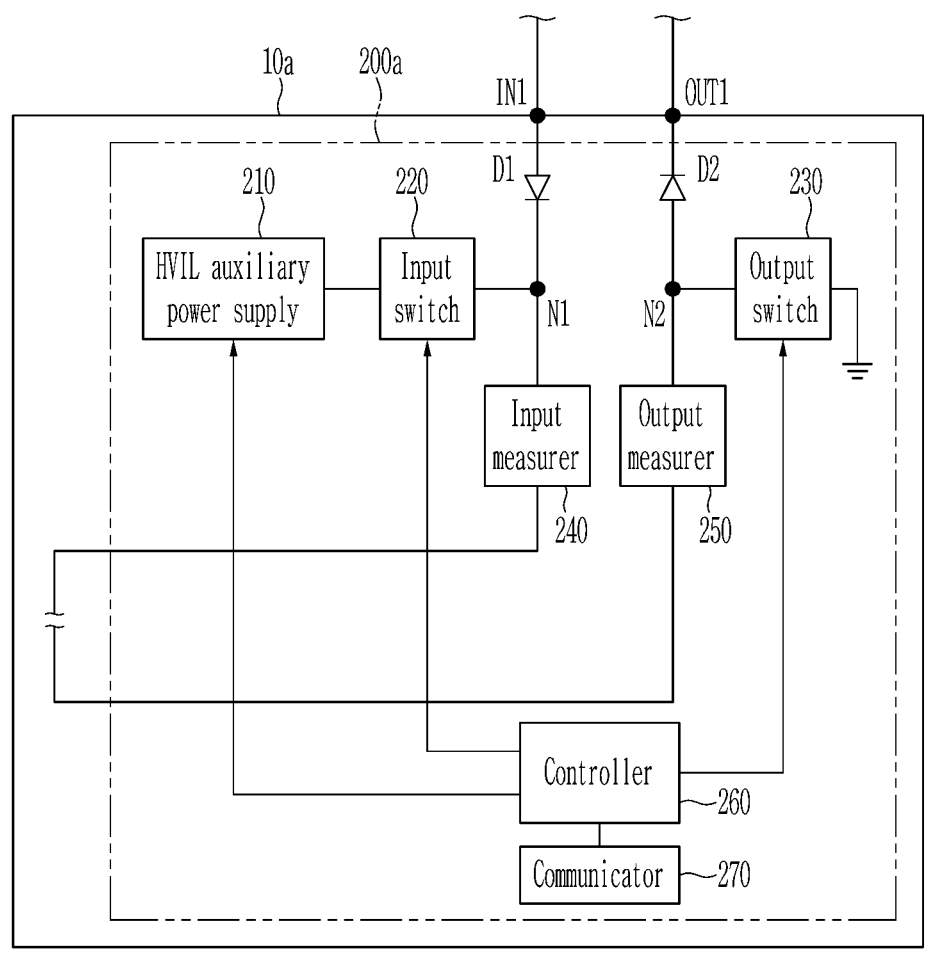
FIG. 3 is a schematic diagram showing an HVIL state monitoring apparatus according to an embodiment.

FIG. 3 is a schematic diagram showing an HVIL state monitoring apparatus according to an embodiment. In FIG. 3, only one HVIL status monitoring apparatus 200a is shown for convenience, but HVIL status monitoring apparatuses 200b to 200n may also be configured identically or similarly.

Referring to FIG. 3, the HVIL status monitoring apparatus 200a may include an HVIL auxiliary power supply 210, an input switch 220, an output switch 230, an input measurer 240, an output measurer 250, and a controller 260 and a communicator 270. Furthermore, the HVIL status monitoring apparatus 200a may further include diodes D1 and D2.

The HVIL auxiliary power supply 210 may operate according to a control signal of the controller 260 and supply the HVIL auxiliary power signal. The HVIL auxiliary power supply 210 may be a constant voltage source or a constant current source. The HVIL auxiliary power supply 210 may be located inside the HVIL status monitoring apparatus 200a or may be located outside the HVIL status monitoring apparatus 200a. The HVIL auxiliary power supply 210 may be an independent power supply inside the battery pack 10a. The HVIL auxiliary power signal may be one of a voltage signal, current signal, PWM signal or frequency signal.

The input switch 220 may be connected between the HVIL auxiliary power supply 210 and the input node N1. The input node N1 may be a node between the HVIL input terminal IN1 of the battery pack 10a and the HVIL input terminal IN2 of the high voltage connector 100a. The input switch 220 may be turned on according to a control signal from the controller 260. If the input switch 220 is turned on, the HVIL auxiliary power signal supplied from the HVIL auxiliary power supply 210 may be supplied to the HVIL input terminal IN1 of the battery pack 10a. Meanwhile, if the input switch 220 is turned off, the HVIL main power signal supplied from the ECU 20 may be supplied to the HVIL input terminal IN1 of the battery pack 10a.

The output switch 230 may be connected between the output node N2 and a ground. The output node N2 may be a node between the HVIL output terminal OUT1 of the battery pack 10a and the HVIL output terminal OUT2 of the high voltage connector 100a. The output switch 230 may be turned on according to a control signal from the controller 260. If the output switch 230 is turned on, the output node N2 may be connected to ground.

If the input switch 220 and the output switch 230 are turned on according to the control signals of the controller 260, an HVIL inner loop 110a including the HVIL auxiliary power supply 210, the HVIL input terminal IN2 of the high voltage connector 100a, the HVIL output terminal OUT2 of high voltage connector 100a, and a ground may be formed. Accordingly, the HVIL inner loop 110a of the battery pack 10a may not be connected to the outside of the battery pack 10a. That is, the HVIL inner loop 110a of the battery pack 10a may not be connected to the HVIL inner loop 110b of the battery pack 10b.

Meanwhile, if the input switch 220 and the output switch 230 are turned off, the HVIL inner loop 110a of the battery pack 10a may maintain a connection with the outside of the battery pack 10a. That is, the HVIL inner loop 110a of the battery pack 10a may maintain a connection with the HVIL inner loop 110b of the battery pack 10b. In this case, supply of the HVIL auxiliary power signal to the HVIL inner loop 110a of the battery pack 10a may be stopped.

As such, the HVIL inner loop 110a of the battery pack 10a may be formed differently according to the turn-on and turn-off of the input switch 220 and the output switch 230.

The diode D1 may have an anode connected to the HVIL input terminal IN1 of the battery pack 10a and a cathode connected to the input node N1.

The diode D2 may have an anode connected to the output node N2 and a cathode connected to the HVIL output terminal OUT1 of the battery pack 10a.

For example, the voltage of an external signal of the battery pack may be lower than the voltage of a signal supplied from the HVIL auxiliary power supply 210 due to a short circuit of an HVIL signal line external to the battery pack 10a toward the HVIL input terminal IN1 of the battery pack 10a. Also, the voltage of the external signal of the battery pack 10a toward the HVIL output terminal OUT1 of the battery pack 10a may increase. At this time, without the diodes D1 and D2, the HVIL inner loop 110a of the battery pack 10a may not be formed in a normal direction. That is, the diode D1 and the diode D2 may be used for the purpose of eliminating the influence of external impedance.

The input measurer 240 may measure at least one of an input voltage and an input current of the HVIL inner loop 110a. The input voltage and current of the HVIL inner loop 110a may represent the voltage and current of the HVIL input terminal IN1.

The output measurer 250 may measure at least one of an output voltage and an output current of the HVIL inner loop 110a. The output voltage and output current of the HVIL inner loop 110a may represent the voltage and current of the HVIL output terminal OUT1.

The controller 260 may transmit and receive HVIL-related data with the ECU 20 through communicator 270. If the controller 260 receives an individual HVIL diagnosis instruction from the ECU 20, it may output a control signal for operating the HVIL auxiliary power supply 210 and the control signals for turning on the input switch 220 and the output switch 230, respectively, to the HVIL auxiliary power supply 210, the input switch 220 and the output switch 230, respectively. Accordingly, the HVIL auxiliary power signal may be supplied to the HVIL inner loop 110a of the battery pack 10a.

If receiving the entire HVIL diagnosis instruction from the ECU 20, the controller 260 may not output control signals to the HVIL auxiliary power supply 210, the input switch 220, and the output switch 230. In addition, the ECU 20 may supply the HVIL main power signal to the HVIL inner loop 110a of the battery pack 10a in response to the entire HVIL diagnosis instruction. Accordingly, the supply of the HVIL auxiliary power signal to the HVIL inner loop 110a of the battery pack 10a may be stopped, and the HVIL main power signal may pass through the HVIL inner loop 110a of the battery pack 10a and may be output to the HVIL inner loop 110b of the battery pack 10b.

The controller 260 may detect the connection state of the high voltage connector 100a using the measurement values of the input measurer 240 and the measurement values of the output measurer 250. For example, the controller 260 may determine whether the connection state of the high voltage connector 100a is normal or defective according to whether the measurement values of the input measurer 240 and the measurement values of the output measurer 250 are substantially the same. The phrase "substantially the same" means that the relationship between the measurement values of the input measurer 240 and the measurement values of the output measurer 250 is within the normal range if the high voltage connector 100a is normally connected. In another example, the controller 260 compares the measurement values of the input measurer 240 with the measurement values of the input measurer 240 measured if the connection state of the high voltage connector 100a is normal, and the controller 260 compares the measurement values of the output measurer 250 with the measurement values of the output measurer 250 measured if the connection state of the high voltage connector 100a is normal, and may detect connection state of the connector 100a as normal or defective depending on whether the error is within a set error range.

In addition, controller 260 may provide the ECU 20 with connection state detection information of the high voltage connector 100a corresponding to the entire HVIL diagnosis instruction or the individual HVIL diagnosis instruction of the ECU 20.

The communicator 270 may support communication with the ECU 20. The communicator 270 may support CAN communication. The communicator 270 may support a communication method other than CAN communication.

Figure 4:
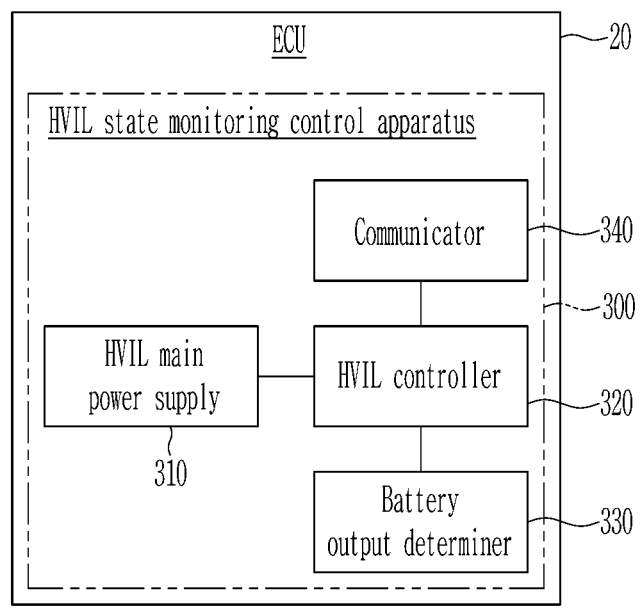
FIG. 4 is a schematic diagram showing an HVIL control apparatus of the ECU shown in FIG. 1.

FIG. 4 is a schematic diagram showing an HVIL control apparatus of the ECU shown in FIG. 1. Referring to FIG. 4, the HVIL state monitoring control apparatus 300 may include an HVIL main power supply 310, an HVIL controller 320, a battery output determiner 330, and a communicator 340.

The HVIL main power supply 310 may supply the HVIL main power signal according to a control signal of the HVIL controller 320. The HVIL main power signal may be power supplied from the ECU 20. The HVIL main power signal may be one of a voltage signal, current signal, PWM signal or frequency signal. The HVIL main power signal may be returned to the ECU 20 through the HVIL signal line and sequentially pass through the respective high voltage connectors 100a, 100b to 100n. The HVIL main power supply 310 may stop supplying the HVIL main power signal according to the control signal from the HVIL controller 320.

The HVIL controller 320 may transmit entire HVIL diagnosis instructions to the HVIL state monitoring apparatuses 200a to 200n of the plurality of battery packs 10a to 10n at predetermined cycles. The HVIL controller 320 may output, to the HVIL main power supply 310, a control signal instructing supply of the HVIL main power signal to the HVIL main power supply 310 in response to the entire HVIL diagnosis instructions.

The HVIL controller 320 may check the connection state detection information received from the HVIL state monitoring apparatuses 200a to 200n of the plurality of battery packs 10a to 10n in response to the entire HVIL diagnosis instructions. The HVIL controller 320 may transmit individual HVIL diagnosis instruction to the HVIL state monitoring apparatus of the battery pack in which a connection state fault is detected based on the connection state detection information received from the HVIL state monitoring apparatus 200a to 200n in response to the entire HVIL diagnosis instructions. The HVIL controller 320 may output, to the HVIL main power supply 310, a control signal instructing to stop supplying the HVIL main power signal in response to the individual HVIL diagnosis instruction.

The HVIL controller 320 may check connection state detection information received from the HVIL state monitoring apparatus of the battery pack in response to individual HVIL diagnosis instruction. The HVIL controller 320 may check whether the battery pack is defective based on the connection state detection information received in response to the individual HVIL diagnosis instruction. HVIL controller 320 may transmit whether a battery pack is defective to the battery output determiner 330.

The battery output determiner 330 may determine whether to output power from the battery pack according to whether the battery pack is defective. If it is determined that the battery pack is defective, the battery output determiner 330 may block the power output of the battery pack. If it is determined that the battery pack is not defective, the battery output determiner 330 may determine to maintain the power output of the battery pack.

The communicator 340 may communicate with the HVIL state monitoring apparatuses 200a to 200n of the plurality of battery packs 10a to 10n. The communicator 340 may support CAN communication. The communicator 340 may support a communication method other than CAN communication.

Figure 5:
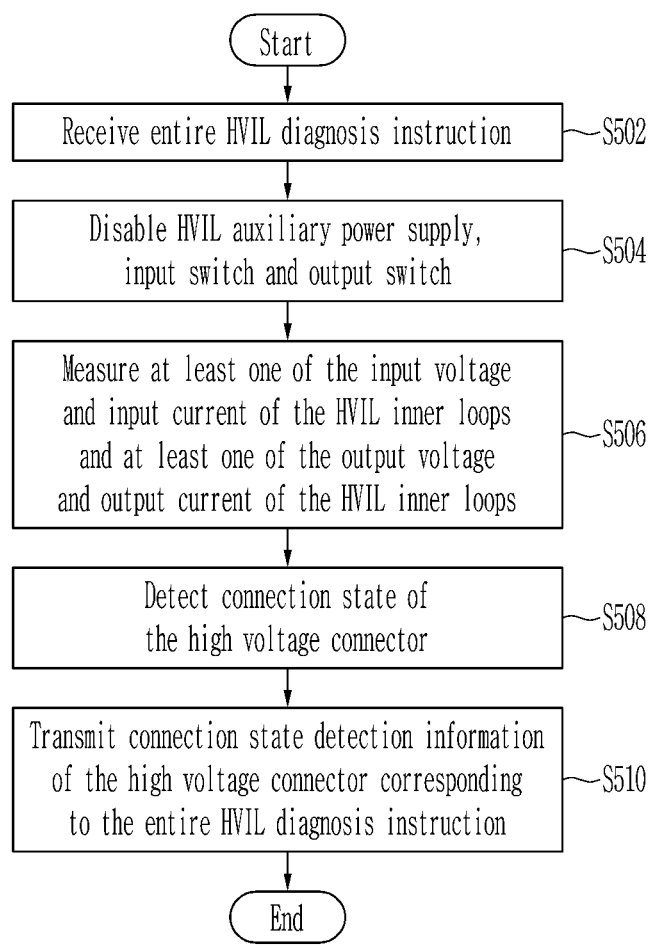
FIG. 5 is a flowchart showing a method for monitoring an HVIL state according to the entire HVIL diagnosis instruction of the HVIL state monitoring apparatus shown in FIG. 3.

FIG. 5 is a flowchart showing a method for monitoring an HVIL state according to the entire HVIL diagnosis instruction of the HVIL state monitoring apparatus shown in FIG. 3.

Referring to FIG. 5, the HVIL state monitoring control apparatus 300 of the ECU 20 may transmit entire HVIL diagnosis instructions to the HVIL state monitoring apparatuses 200a to 200n, and may supply the HVIL main power signal.

If the HVIL state monitoring apparatuses 200a to 200n may receive the entire HVIL diagnosis instructions from the HVIL state monitoring control apparatus 300 (S502), may disable the HVIL auxiliary power supply 210, the input switch 220 and the output switch 230 by not outputting each control signal to the HVIL auxiliary power supply 210, the input switch 220, and the output switch 230 (S504). Accordingly, the HVIL main power signal may return to the ECU 20 again by passing through the high voltage connectors 100a to 100n of each battery pack 10a to 10n through the HVIL inner loop 110a to 110n of each battery pack 10a to 10n.

The HVIL state monitoring apparatuses 200a to 200n may measure at least one of the input voltage and input current of the HVIL inner loops 110a to 110n and at least one of the output voltage and output current of the HVIL inner loops 110a to 110n in response to the entire HVIL diagnosis instructions, respectively (S506).

The HVIL state monitoring apparatuses 200a to 200n may detect connection state of the high voltage connectors 100a to 100n using the at least one of the input voltage and input current of the HVIL inner loops 110a to 110n and the at least one of the output voltage and output current of the HVIL inner loops 110a to 110n, respectively (S508).

The HVIL state monitoring apparatuses 200a to 200n may transmit connection state detection information of the high voltage connectors 100a to 100n corresponding to the entire HVIL diagnosis instructions to the HVIL state monitoring control apparatus 300 of the ECU 20, respectively (S510).

The HVIL state monitoring control apparatus 300 of the ECU 20 may check connection state detection information corresponding to the entire HVIL diagnosis instructions received from the HVIL state monitoring apparatuses 200a to 200n of the battery pack 10a to 10n.

If a connection state fault in at least one of the HVIL state monitoring apparatuses 200a to 200n of the plurality of battery packs 10a to 10n is detected, the HVIL state monitoring control apparatus 300 of the ECU 20 may transmit an individual HVIL diagnosis instruction to the HVIL state monitoring apparatus in which the connection state fault is detected.

Figure 6:
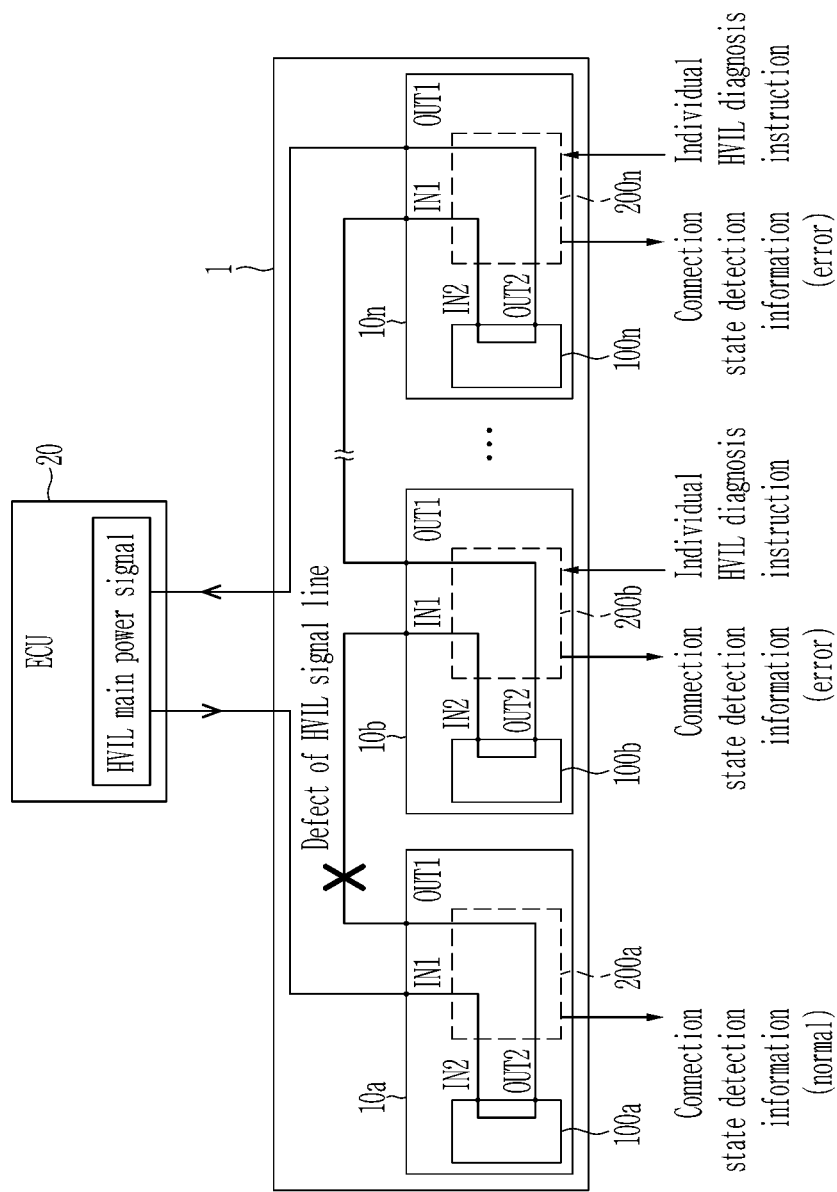
FIG. 6 is schematic diagram showing an example of connection state detection information of each HVIL state monitoring apparatus when an HVIL signal line between two battery packs is defective.

FIG. 6 shows an example of connection state detection information of each HVIL state monitoring apparatus when an HVIL signal line between two battery packs is defective.

As shown in FIG. 6, it is assumed that a defect occurs in the HVIL signal line between battery pack 10a and battery pack 10b.

The ECU 20 may transmit the entire HVIL diagnosis instruction and supply the HVIL main power signal to the HVIL signal line.

The HVIL main power signal passes through the HVIL inner loop 110a of the battery pack 10a and may be output to the outside of the battery pack 10a. However, if a defect occurs in the HVIL signal line between the battery pack 10a and the battery pack 10b, the HVIL main power signal is not input to the HVIL input terminal IN1 of the battery packs 10b to 10n.

Accordingly, the HVIL state monitoring apparatus 200a of the battery pack 10a detects that the connection state of the high voltage connector 100a is normal in response to the entire HVIL diagnosis instruction, whereas the HVIL state monitoring apparatuses 200b to 200n of the battery pack 10b to 10n may detect the connection state of high voltage connectors 100b to 100n (e.g., defective) in response to the entire HVIL diagnosis instruction.

The HVIL state monitoring apparatuses 200a to 200n of the battery packs 10a to 10n may transmit connection state detection information in response to the overall HVIL diagnosis instructions, respectively, to the HVIL state monitoring control apparatus 300 of the ECU 20.

The HVIL state monitoring control apparatus 300 of the ECU 20 may transmit individual HVIL diagnosis instructions to the HVIL state monitoring apparatuses 200b to 200n in which connection state fault is detected from connection state detection information corresponding to entire HVIL diagnosis instructions.

Figure 7:
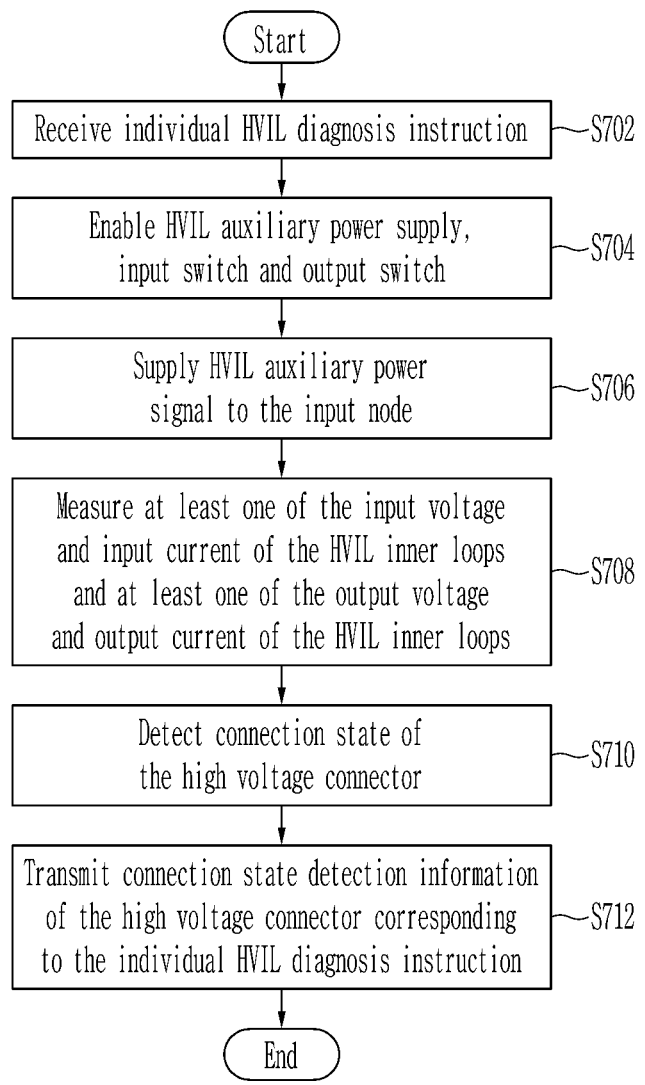
FIG. 7 is a flowchart showing a method for monitoring an HVIL state according to an individual HVIL diagnosis instruction of the HVIL state monitoring apparatus shown in FIG. 3.

FIG. 7 is a flowchart showing a method for monitoring an HVIL state according to an individual HVIL diagnosis instruction of the HVIL state monitoring apparatus shown in FIG. 3.

In FIG. 7, as in the situation shown in FIG. 6, a case in which a connection state fault is detected in the HVIL state monitoring apparatuses 200b to 200n excluding the HVIL state monitoring apparatus 200a is assumed and described.

Referring to FIG. 7, the HVIL state monitoring control apparatus 300 of the ECU 20 may transmit individual HVIL diagnosis instructions to the HVIL state monitoring apparatuses 200b to 200n.

HVIL state monitoring apparatuses 200b to 200n may receive individual HVIL diagnosis instructions from the HVIL state monitoring control apparatus 300 of the ECU 20 (S702), may enable the HVIL auxiliary power supply 210, the input switch 220 and the output switch 230 by transmitting control signals to the HVIL auxiliary power supply 210, the input switch 220, and the output switch 230 (S704).

The enabled HVIL auxiliary power supply 210 may supply HVIL auxiliary power, and the enabled input switch 220 and output switch 230 may be turned on. Accordingly, the HVIL inner loops 110b to 110n of the battery packs 10b to 10n may be connected to the ground without being connected to the HVIL inner loops of the adjacent battery packs.

The HVIL state monitoring apparatuses 200b to 200n may supply the HVIL auxiliary power signal to the input node N1 (S706). That is, the HVIL state monitoring apparatuses 200b to 200n may supply HVIL auxiliary power signals to the HVIL inner loops 110b to 110n.

The HVIL status monitoring apparatuses 200b to 200n may measure at least one of the input voltage and input current of the HVIL inner loops 110a to 110n and at least one of the output voltage and output current of the HVIL inner loops 110a to 110n in response to the individual HVIL diagnosis instructions, respectively (S708).

The HVIL status monitoring apparatuses 200b to 200n may detect connection state of the high voltage connectors 100b to 100n using the at least one of the input voltage and input current of the HVIL inner loops 110b to 110n and the at least one of the output voltage and output current of the HVIL inner loops 110b to 110n, respectively (S710). For example, the HVIL status monitoring apparatuses 200b to 200n may determine whether the connection state of the high voltage connector 100b to 100n is normal or defective according to whether the input voltage and output voltage of the HVIL inner loops 110b to 110n are substantially the same and/or the input current and output current of the HVIL inner loops 110b to 110n are substantially the same.

The HVIL state monitoring apparatuses 200b to 200n may transmit connection state detection information of the high voltage connectors 100b to 100n corresponding to individual HVIL diagnosis instructions to the HVIL state monitoring control apparatus 300 of the ECU 20, respectively (S712).

The HVIL state monitoring control apparatus 300 of the ECU 20 may check connection state detection information corresponding to the individual HVIL diagnosis instructions received from the HVIL state monitoring apparatuses 200b to 200n of the battery pack 10b to 10n.

These HVIL state monitoring apparatuses 200a to 200n may represent computing devices in which the HVIL state monitoring method described above is implemented. The HVIL state monitoring apparatuses 200a to 200n may include at least one processor. At least one processor may be implemented as an application processor (AP), a central processing unit (CPU), a graphic processing unit (GPU), and the like. At least one processor stores program commands for implementing at least some functions of the HVIL auxiliary power supply 210, the input switch 220, the output switch 230, the input measurer 240, the output measurer 250, the controller 260 and the communicator 270 in memory, and execute program commands stored in the memory to perform the HVIL state monitoring method.

Figure 8:
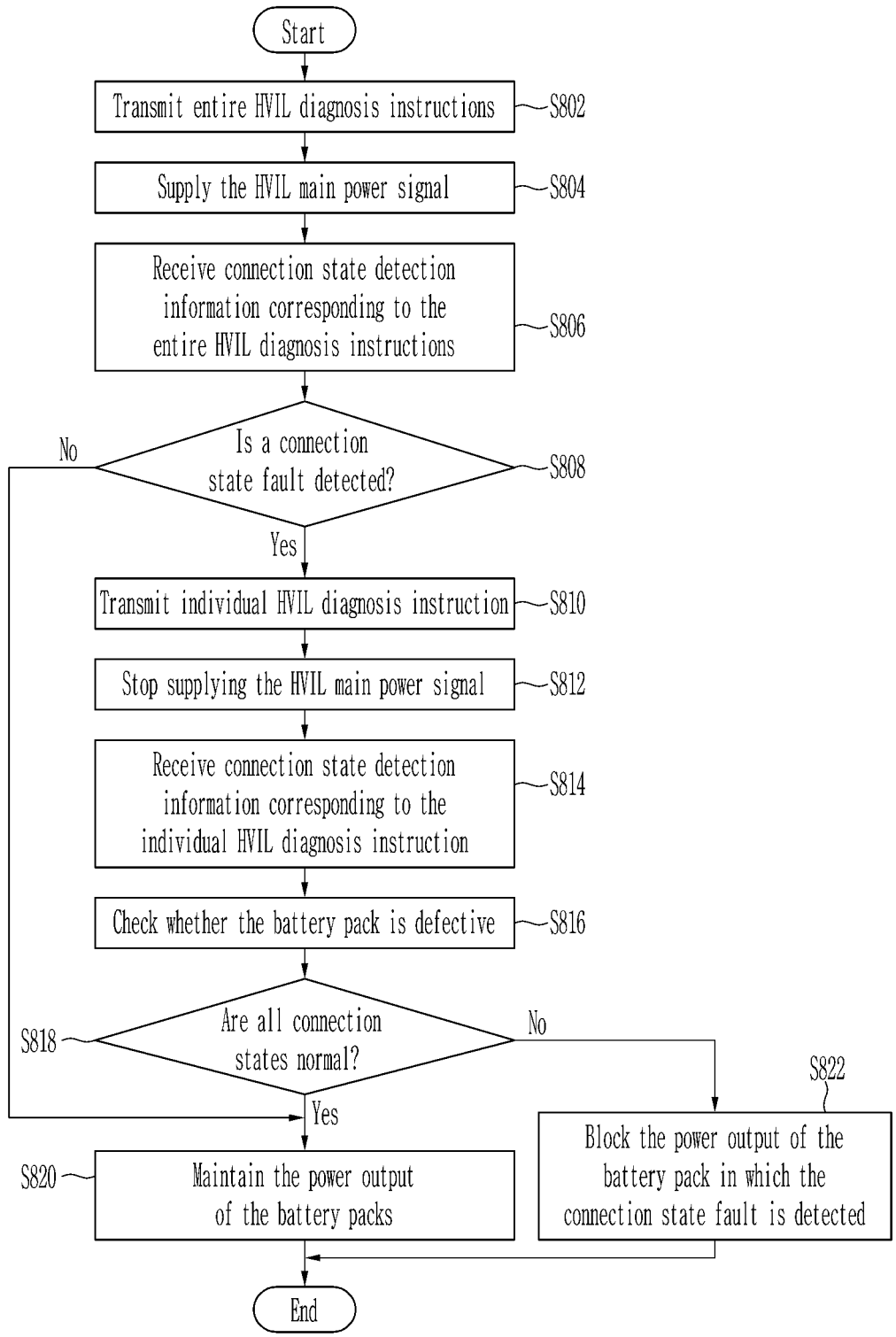
FIG. 8 is a flowchart showing a method for controlling an HVIL state monitoring of the HVIL state monitoring control apparatus shown in FIG. 4.

FIG. 8 is a flowchart showing a method for controlling an HVIL state monitoring of the HVIL state monitoring apparatus shown in FIG. 4.

Referring to FIG. 8, the HVIL state monitoring control apparatus 300 of the ECU 20 may transmit the entire HVIL diagnosis instructions to the HVIL state monitoring apparatuses 200a to 200n (S802), and may supply the HVIL main power signal to the HVIL signal line (S804).

Thereafter, the HVIL state monitoring control apparatus 300 of the ECU 20 may receive connection state detection information corresponding to the entire HVIL diagnosis instructions from the HVIL state monitoring apparatuses 200a to 200n (S806).

If the HVIL state monitoring control apparatus 300 of the ECU 20 detects a connection state fault in at least one of the HVIL state monitoring apparatuses 200a to 200n of the plurality of battery packs 10a to 10n, individual HVIL diagnosis instructions may be transmitted to the HVIL state monitoring apparatus 200b to 200n in which a connection state fault is detected (S810). Connection state faults may be detected in the HVIL state monitoring apparatuses 200b to 200n.

The HVIL state monitoring control apparatus 300 of the ECU 20 may stop supplying the HVIL main power signal in response to an individual HVIL diagnosis instruction (S812).

The HVIL state monitoring control apparatus 300 of the ECU 20 may receive connection state detection information corresponding to an individual HVIL diagnosis instruction from the HVIL state monitoring apparatus 200b to 200n in which the connection state fault is detected (S814).

The HVIL state monitoring control apparatus 300 of the ECU 20 may check whether the battery pack is defective from the connection state detection information corresponding to the individual HVIL diagnosis instruction (S816).

The HVIL state monitoring control apparatus 300 of the ECU 20 may determine whether to output power from the battery pack according to whether the battery pack is defective. If all connection state detection information corresponding to the individual HVIL diagnosis instructions indicates a normal connection state (S818), the HVIL state monitoring control apparatus 300 of the ECU 20 may determine that the battery packs 10b to 10n are not defective, and may maintain the power output of the battery packs 10b to 10n (S820). If the connection state fault is detected from the connection state detection information corresponding to the individual HVIL diagnosis instruction, the HVIL state monitoring control apparatus 300 of the ECU 20 may block the power output of the battery pack in which the connection state fault is detected (S822).

On the other hand, if all connection state indicates normal from the connection state detection information corresponding to the entire HVIL diagnosis instruction (S808), the HVIL state monitoring control apparatus 300 of the ECU 20 may maintain the power output of the battery packs 10a to 10n (S820).

The HVIL state monitoring control apparatus 300 of the ECU 20 may represent a computing device in which the HVIL state monitoring control method described above is implemented. The HVIL state monitoring control apparatus 300 may include at least one processor implemented as an application processor (AP), a central processing unit (CPU), a graphic processing unit (GPU), and the like. The at least one processor stores program commands for implementing at least some functions of the HVIL main power supply 310, the HVIL controller 320, the battery output determiner 330, and the communicator 340 in a memory, and execute program commands stored in the memory to perform the HVIL status monitoring control method.

Figure 9:
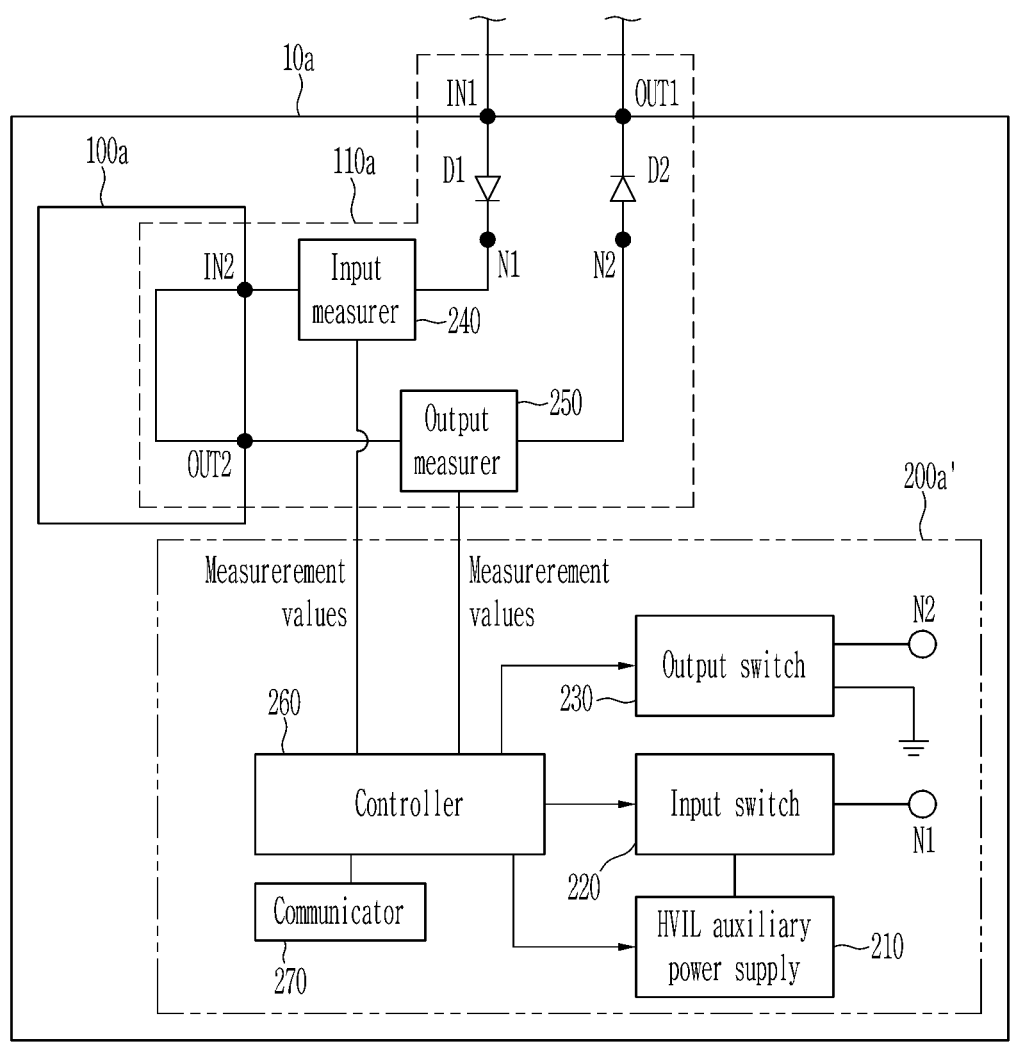
FIG. 9 is a schematic diagram showing an HVIL state monitoring apparatus according to another embodiment.

FIG. 9 is a schematic diagram showing an HVIL state monitoring apparatus according to another embodiment.

Referring to FIG. 9, unlike FIG. 3, the HVIL state monitoring apparatus 200a' may be positioned independently of the HVIL inner loop 110a of the battery pack 10a.

In the case of FIG. 3, the HVIL inner loop 110a of the battery pack 10a may pass through the HVIL state monitoring apparatus 200a.

Meanwhile, in the case of FIG. 9, the HVIL inner loop 110a of the battery pack 10a does not pass through the HVIL state monitoring apparatus 200a'. Therefore, the HVIL state monitoring apparatus 200a' may be implemented on a board independent of the HVIL inner loop 110a of the battery pack 10a, and the input measurer 240, the output measurer 250 and the diodes D1 and D2 may be implemented on the HVIL inner loop 110a.

The HVIL state monitoring apparatus 200a' may perform HVIL state monitoring in the same way as described above.

According to at least one embodiment of the embodiments, in a battery system using a high voltage interlock loop (HVIL) power source of a vehicle and diagnosing a connection state of a high voltage connector in each battery pack using the HVIL, it is possible to accurately determine whether a defect is a defect inside of the battery pack or a defect outside of the battery pack. As a result, the reliability of diagnosis based on HVIL can be improved, and the safe driving range of the vehicle can be expanded.

Although the embodiments of the present invention have been described in detail above, the scope of the present invention is not limited thereto, and various modifications and improvements made by those skilled in the art using the basic concept of the present invention defined in the following claims are also included in the scope of the present invention.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a high voltage interlock loop (HVIL) signal line;
at least one high voltage connector connecting the HVIL signal line to form a HVIL loop; and
an HVIL state monitoring apparatus having an HVIL auxiliary power supply that generates and applies a HVIL auxiliary power signal to an input terminal of the at least one high voltage connector, while an external controller stops applying an HVIL main power signal to the HVIL signal line,
wherein the HVIL main power signal and the HVIL auxiliary power signal each are one of a voltage signal, a current signal, a pulse width modulation (PWM) signal, or a frequency signal.

2. The battery pack as claimed in claim 1, wherein the HVIL state monitoring apparatus further comprises:
an input switch connected between an input node, through which the HVIL signal line is input, and the HVIL auxiliary power supply;
an output switch connected between an output node, from which the HVIL signal line is output, and a ground; and
a controller configured to:
turn off the input switch and the output switch, while applying the HVIL main power signal to the HVIL signal line by the external controller, and
turn on the input switch and the output switch while stopping applying the HVIL main power signal to the HVIL signal line by the external controller.

3. The battery pack as claimed in claim 2, wherein the controller is further configured to:
  detect a connection state of the high voltage connector in response to an HVIL diagnosis instruction from the external controller; and
  transmit connection state detection information of the high voltage connector to the external controller.

4. The battery pack as claimed in claim 3, wherein the controller is further configured to:
  turn off the input switch and the output switch in response to a first HVIL diagnosis instruction from the external controller, and
  turn on the input switch and the output switch in response to a second HVIL diagnosis instruction from the external controller.

5. The battery pack as claimed in claim 4, wherein the external controller is configured to transmit the second HVIL diagnosis instruction to the HVIL state monitoring apparatus of the battery pack in which a connection state failure is detected by the external controller from the connection state detection information of the high voltage connector corresponding to the first HVIL diagnosis instruction.

6. The battery pack as claimed in claim 3, wherein the controller is configured to detect the connection state of the high voltage connector based on a measurement value of the input node and a measurement value of the output node, the measurement value being at least one of voltage and current.

7. The battery pack as claimed in claim 6, wherein the controller is configured to:
  compare the measurement value of the input node and the measurement value of the output node with measurement values if the connection state of the high voltage connector is normal, and
  detect a defective connection state if a comparison result does not satisfy a predetermined error range.

8. The battery pack as claimed in claim 6, wherein the HVIL state monitoring apparatus further comprises:
  an input measurer configured to measure at least one of a voltage and a current of the input node; and
  an output measurer configured to measure at least one of a voltage and a current of the output node.

9. The battery pack as claimed in claim 2, wherein the HVIL state monitoring apparatus further comprises:
  a first diode connected between an HVIL input terminal of the battery pack to which the HVIL signal line is input and the input node; and
  a second diode connected between the output node and an HVIL output terminal of the battery pack from which the HVIL signal line is output.

10. A battery system, comprising:
  a high voltage interlock loop (HVIL) signal line; and
  at least one battery pack having:
    at least one high voltage connector connecting the HVIL signal line to form one HVIL loop,
    an HVIL auxiliary power supply that generates an HVIL auxiliary power signal, and
    an HVIL state monitoring apparatus that applies the HVIL auxiliary power signal to the HVIL signal line while an external controller stops applying an HVIL main power signal to the HVIL signal line,
    wherein the HVIL main power signal and the HVIL auxiliary power signal each are one of a voltage signal, a current signal, a pulse width modulation (PWM) signal, or a frequency signal.

11. The battery system as claimed in claim 10, wherein the HVIL state monitoring apparatus includes:
  an input switch connected between an input node, through which the HVIL signal line is input, and the HVIL auxiliary power supply;
  an output switch connected between an output node, from which the HVIL signal line is output, and a ground; and
  a controller configured to:
    turn off the input switch and the output switch while applying the HVIL main power signal to the HVIL signal line by the external controller, and
    turn on the input switch and the output switch while stopping applying the HVIL main power signal to the HVIL signal line by the external controller.

12. The battery system as claimed in claim 11, wherein the controller is further configured to:
  turn off the input switch and the output switch in response to a first HVIL diagnosis instruction from the external controller, and
  turn on the input switch and the output switch in response to a second HVIL diagnosis instruction from the external controller.

13. The battery system as claimed in claim 12, wherein the controller is configured to:
  detect a connection state of the at least one high voltage connector in response to the first HVIL diagnosis instruction and the second HVIL diagnosis instruction, and
  transmit connection state detection information of the at least one high voltage connector to the external controller.

14. The battery system as claimed in claim 13, wherein the second HVIL diagnosis instruction is transmitted to the HVIL state monitoring apparatus of the battery pack in which a connection state failure is detected by the external controller from the connection state detection information of the at least one high voltage connector corresponding to the first HVIL diagnosis instruction.

15. The battery system as claimed in claim 11, wherein the HVIL state monitoring apparatus further comprises:
  a first diode connected between an HVIL input terminal of the battery pack, to which the HVIL signal line is input, and the input node; and
  a second diode connected between the output node and an HVIL output terminal of the battery pack from which the HVIL signal line is output.

16. A high voltage interlock loop (HVIL) state monitoring apparatus, comprising:
  a HVIL signal line configured to connect through at least one high voltage connector to form a HVIL loop;
  a HVIL auxiliary power supply configured to generate a HVIL auxiliary power signal;
  an input switch connected between an input node, through which the HVIL signal line is input, and the HVIL auxiliary power supply;
  an output switch connected between an output node, from which the HVIL signal line is output, and a ground; and
  a controller configured to:
    turn off the input switch and the output switch while applying an HVIL main power signal to the HVIL signal line by an external controller, and
    turn on the input switch and the output switch while stopping applying the HVIL main power signal to the HVIL signal line by the external controller.

17. The HVIL state monitoring apparatus as claimed in claim 16, wherein the controller is configured to:
  turn off the input switch and the output switch in response to a first HVIL diagnosis instruction from the external controller, and turn on the input switch and the output switch in response to a second HVIL diagnosis instruction from the external controller.

18. The HVIL state monitoring apparatus as claimed in claim 16, wherein the controller is configured to:
   detect a connection state of the at least one high voltage connector in response to the first HVIL diagnosis instruction and the second HVIL diagnosis instruction, respectively, and
   transmit connection state detection information of the at least one high voltage connector to the external controller.

19. The HVIL state monitoring apparatus as claimed in claim 18, wherein the second HVIL diagnosis instruction is transmitted to the HVIL state monitoring apparatus in which a connection state failure is detected by the external controller from the connection state detection information of the at least one high voltage connector corresponding to the first HVIL diagnosis instruction.

20. A high voltage interlock loop (HVIL) state monitoring method, comprising:
   detecting from an adequate connection state of at least one high voltage connector when an HVIL main power signal is supplied by an external controller to an HVIL signal line connecting through the at least one high voltage connector to form one HVIL loop;
   generating an HVIL auxiliary power signal;
   applying the HVIL auxiliary power signal to the HVIL signal line while the external controller stops supplying the HVIL main power signal; and
   detecting for the adequate connection state of the at least one high voltage connector.

21. The HVIL state monitoring method as claimed in claim 20, wherein the applying the HVIL auxiliary power signal to the HVIL signal line includes turning on:
   an input switch connected between an input node, through which the HVIL signal line is input, and an HVIL auxiliary power supply generating the HVIL auxiliary power signal, and
   an output switch connected between an output node, through which the HVIL signal line is output, and a ground.

22. The HVIL state monitoring method as claimed in claim 21, further comprising turning off the input switch and the output switch while the HVIL main power signal is applied by the external controller.

23. The HVIL state monitoring method as claimed in claim 21, further comprising transmitting connection state detection information of the at least one high voltage connector to the external controller, wherein applying the HVIL auxiliary power signal to the HVIL signal line includes stopping the supply of the HVIL main power signal by the external controller if a connection state failure is detected from the connection state detection information.

24. A high voltage interlock loop (HVIL) state monitoring control method to monitor a connection state of at least one high voltage connector including one HVIL loop of an HVIL signal line connected to an external controller, the method comprising:
   applying an HVIL main power signal to the HVIL signal line;
   receiving first connection state detection information of the at least one high voltage connector detected in response to a first HVIL diagnosis instruction from the external controller while the HVIL main power signal is applied; and
   stopping supply of the HVIL main power signal if connection state failure is detected from the first connection state detection information,
   wherein an HVIL auxiliary power signal is applied to the HVIL signal line by an HVIL auxiliary power supply while the supply of the HVIL main power signal is stopped.

25. The method as claimed in claim 24, further comprising receiving second connection state detection information of the at least one high voltage connector detected in response to a second HVIL diagnosis instruction from the external controller while the HVIL auxiliary power signal is applied.

26. The method as claimed in claim 25, wherein when the HVIL auxiliary power signal is applied:
   an input switch connected between an input node, through which the HVIL signal line is input, and the HVIL auxiliary power supply, and an output switch connected between an output node, through which the HVIL signal line is output, and a ground are turned on, and
   the input switch and the output switch are turned off while the HVIL main power signal is applied.

27. The method as claimed in claim 25, further comprising blocking an output of a device including the at least one high voltage connector if the connection state failure is detected from the first connection state detection information.

* * * * *